US012591493B2

(12) United States Patent   (10) Patent No.: US 12,591,493 B2
Naidu et al.   (45) Date of Patent: Mar. 31, 2026

(54) REBUILDING A DESTINATION FILE SYSTEM AS PART OF A RESYNC OPERATION

(71) Applicant: NetApp, Inc., San Jose, CA (US)

(72) Inventors: Abhishek Naidu, San Jose, CA (US); Rachita Kothiyal, San Jose, CA (US); Atul Ramesh Pandit, Los Gatos, CA (US); Anil Kumar Ponnapur, Sunnyvale, CA (US); Tijin George, San Jose, CA (US); Boopathy Krishnamoorthy, Karnataka (IN)

(73) Assignee: NetApp, Inc., San Jose, CA (US)

( * ) Notice: Subject to any disclaimer, the term of this patent is extended or adjusted under 35 U.S.C. 154(b) by 51 days.

(21) Appl. No.: 18/636,831

(22) Filed: Apr. 16, 2024

(65) Prior Publication Data

US 2025/0321841 A1      Oct. 16, 2025

(51) Int. Cl.
  *G06F 11/20*      (2006.01)
  *G06F 11/14*      (2006.01)
  *G06F 11/1446*      (2026.01)
(52) U.S. Cl.
  CPC ...... *G06F 11/2082* (2013.01); *G06F 11/1435* (2013.01); *G06F 11/1464* (2013.01); *G06F 11/2056* (2013.01); *G06F 11/2069* (2013.01)
(58) Field of Classification Search
  CPC ............. G06F 11/1435; G06F 11/1464; G06F 11/2056; G06F 11/2069; G06F 11/2082
  See application file for complete search history.

(56) References Cited

U.S. PATENT DOCUMENTS

| | | | | |
|---|---|---|---|---|
| 6,289,357 | B1 * | 9/2001 | Parker | G06F 11/2082 |
| | | | | 707/610 |
| 8,655,848 | B1 * | 2/2014 | Leverett | G06F 16/178 |
| | | | | 709/201 |
| 9,832,260 | B2 * | 11/2017 | Bare, II | G06F 3/0613 |
| 10,360,099 | B2 | 7/2019 | Subramanian et al. | |
| 10,521,143 | B2 | 12/2019 | Subramanian et al. | |
| 11,036,420 | B2 | 6/2021 | Thoppil et al. | |
| 11,048,430 | B2 | 6/2021 | Thoppil et al. | |
| 11,132,339 | B2 | 9/2021 | Kaushik et al. | |

(Continued)

OTHER PUBLICATIONS

"FabricPool tier management", NetApp, URL: https://docs.netapp.com/us-en/ontap/pdfs/sidebar/FabricPool_tier_management.pdf, Apr. 16, 2024, 58 pages.

(Continued)

*Primary Examiner* — Michael Maskulinski

(74) *Attorney, Agent, or Firm* — Cooper Legal Group, LLC

(57)      ABSTRACT

Techniques are provided for rebuilding a destination file system as part of a resync operation. A file system of a first node may be replicated to a second node as a destination file system. The file system may include clone files that were created as clones of parent files. The clone files may have been created in a storage efficient manner where a clone file refers to data of a parent file, instead physically storing duplicate instances of the parent data of the parent file. The techniques provided herein are capable of replicating the clone files to the second node while preserve the storage efficiency of the clone files during a resync operation that rebuilds the destination file system after recovering from a failure of the second node.

20 Claims, 8 Drawing Sheets

(56)  References Cited

U.S. PATENT DOCUMENTS

| | | | |
|---|---|---|---|
| 11,144,503 B2 * | 10/2021 | George | G06F 11/1464 |
| 11,151,162 B2 | 10/2021 | Narasingarayanapeta et al. | |
| 11,210,013 B2 | 12/2021 | Thoppil et al. | |
| 11,615,001 B2 | 3/2023 | Naidu et al. | |
| 11,650,886 B2 | 5/2023 | Mathew et al. | |
| 11,853,104 B2 | 12/2023 | Naidu et al. | |
| 2017/0192849 A1 * | 7/2017 | Xiao | G06F 11/1446 |
| 2025/0321929 A1 | 10/2025 | Naidu et al. | |

OTHER PUBLICATIONS

"HA pair management", NetApp, URL: https://docs.netapp.com/us-en/ontap/pdfs/sidebar/HA_pair_management.pdf, Apr. 16, 2024, 26 pages.
"SVM data mobility", NetApp, URL: https://docs.netapp.com/us-en/ontap/pdfs/sidebar/SVM_data_mobility.pdf, Apr. 16, 2024, 14 pages.

* cited by examiner

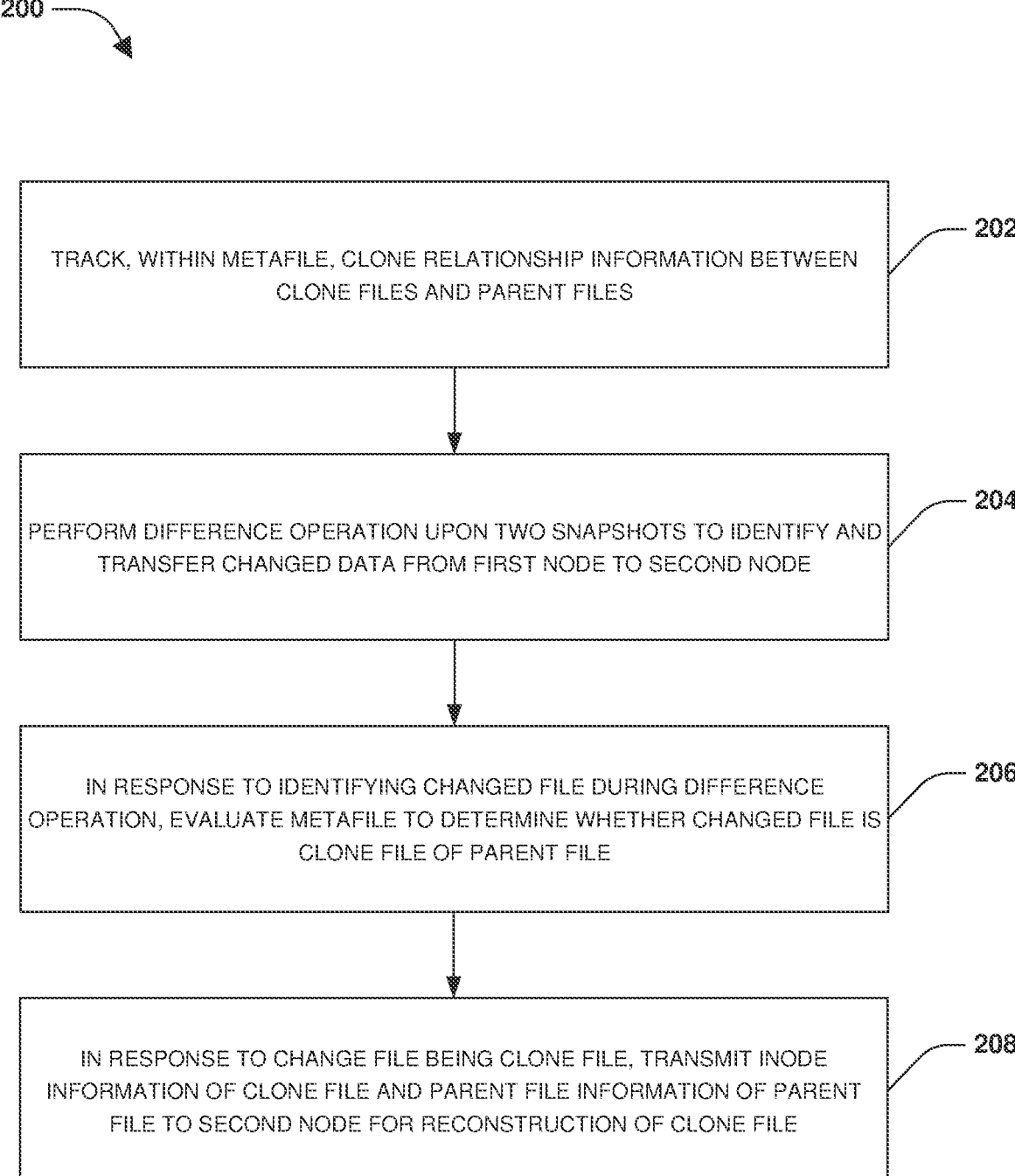

200

TRACK, WITHIN METAFILE, CLONE RELATIONSHIP INFORMATION BETWEEN
CLONE FILES AND PARENT FILES — 202

PERFORM DIFFERENCE OPERATION UPON TWO SNAPSHOTS TO IDENTIFY AND
TRANSFER CHANGED DATA FROM FIRST NODE TO SECOND NODE — 204

IN RESPONSE TO IDENTIFYING CHANGED FILE DURING DIFFERENCE
OPERATION, EVALUATE METAFILE TO DETERMINE WHETHER CHANGED FILE IS
CLONE FILE OF PARENT FILE — 206

IN RESPONSE TO CHANGE FILE BEING CLONE FILE, TRANSMIT INODE
INFORMATION OF CLONE FILE AND PARENT FILE INFORMATION OF PARENT
FILE TO SECOND NODE FOR RECONSTRUCTION OF CLONE FILE — 208

RECEIVE CHANGED BLOCKS FROM FIRST NODE

304

RECEIVE INODE INFORMATION OF CLONE FILES AND PARENT INFORMATION
OF PARENT FILES

306

LOG INODE INFORMATION AND/OR PARENT INFORMATION WITHIN
DESTINATION METAFILE

308

REPLAY LOGGED INFORMATION WITHIN DESTINATION METAFILE TO CREATE
RECONSTRUCTED CLONE FILES

700

702

704

COMPUTER
INSTRUCTIONS

706

01011010001010
10101011010101
101101011100...

708

COMPUTER READABLE
MEDIUM

REBUILDING A DESTINATION FILE SYSTEM AS PART OF A RESYNC OPERATION

BACKGROUND

Many storage environments implement data replication and/or other redundancy data access techniques for data loss protection and non-disruptive client access. For example, a first node provides clients with primary access to data stored within a first volume. The data is replicated to a second volume maintained at a second node. If there is a failure at the first node, then clients are switched over to access the data from the second volume at the second node. This is performed as a switchover operation from the first node to the second node. If the first node recovers from the failure, then a switchback operation is performed. As part of the switchback operation, the first volume is resynced with the second volume by a resync operation because data modifications may have occurred at the second volume while the first volume was inaccessible. Once the first volume is resynchronized with the second volume, the clients are switched back to accessing the data through the first volume.

DESCRIPTION OF THE DRAWINGS

FIG. 2 is a flow chart illustrating an example method for replicating clone files from a source file system to a destination file system in accordance with an embodiment of the present technology.

DETAILED DESCRIPTION

Figure 1:
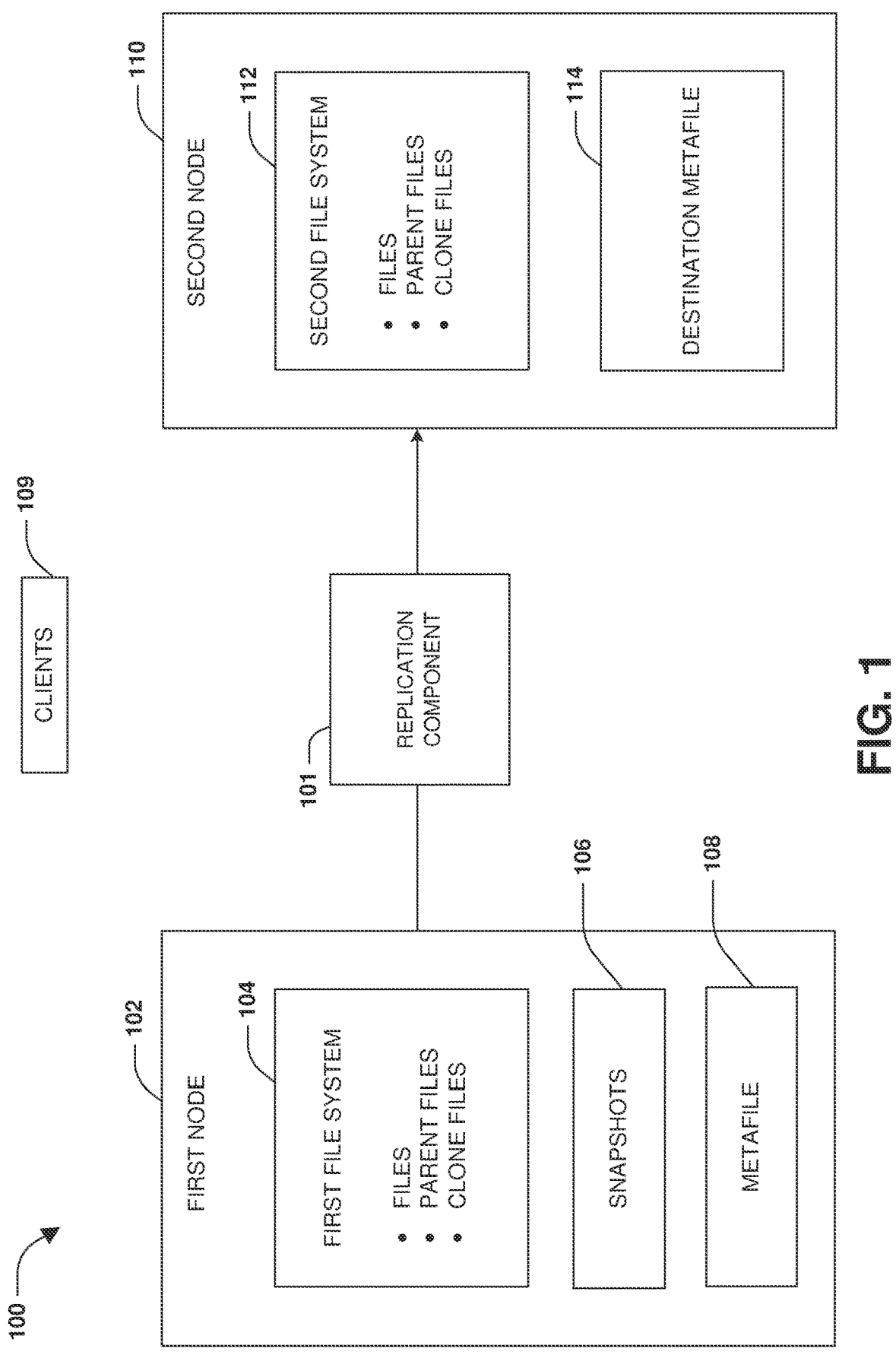
FIG. 1 is a block diagram illustrating an example of a system for replicating clone files from a source file system to a destination file system in accordance with an embodiment of the present technology.

Systems and methods are provided for replicating clone files from a source file system to a destination file system. The source file system may provide the ability to clone files in a storage efficient manner. For example, a file (e.g., a parent file) may be cloned to create a clone file without physically replicating blocks of data of the parent file. Instead, the clone file merely references the blocks of data of the parent file so that a redundant/duplicate copy of the data is not created, thereby using less storage resources. The disclosed techniques are capable of efficiently replicating the clone files from the source file system to the destination file system with less overhead than existing methods. In particular, clone relationship information between the clone files and parent files is tracked within a metafile at a first node hosting the source file system. When performing a difference operation upon two snapshots to identify and replicate changed data (e.g., changed files) from the first node to a second node hosting the destination file system, the metafile is used to identify which changed files are also clone files. Inode information of the clone files and parent file information of the parent files is transferred to the second node that reconstructs the clone files using the inode information and the parent file information. In this way, clone files are efficiently replicated without the overhead of traversing the entire source file system to identify shared and unshared blocks amongst files. The clone files are replicated without having to build a database at the second node (e.g., a data warehouse) to track virtual volume block numbers of parent files reconstructed at the second node and used by reconstructed clone files to reference the parent files.

The disclosed techniques may be utilized within a storage environment or any other computing environment. The storage environment stores data across various storage sites such as for data redundancy, failover protection, and other types of data protection. The storage environment includes a first node (e.g., an on-premises computing environment, a cloud computing environment, a virtual machine, a storage virtual machine, a containerized environment, a storage controller, or other hardware and/or software implemented as a primary storage site) that hosts a first volume as a primary volume (e.g., a first file system) that is made accessible for client access. A second site (e.g., a secondary storage site) hosts a second volume maintained as a secondary volume (e.g., a second file system) that is a backup copy of the primary volume. Data of the primary volume is replicated to the secondary volume so that the secondary volume mirrors the primary volume. Thus, if the first site fails, then clients are redirected to the secondary volume at the second site as part of a failover operation for non-disruptive access to client data.

During an error situation (for example, a disaster) where the first site has a failure and the first volume is not available to clients for accessing the client data, the second site performs a promote operation and transitions the second volume from being the secondary volume to being the primary volume now available for client access through the second site. In this way, the clients can now access the client data through the second volume that has been promoted as the primary volume as part of disaster recovery for the first site. Over time, data modifications are made to the second volume that are not replicated to the first volume because of the failure of first site.

Once the first site recovers, a resync operation (e.g., a reverse resync transfer) is performed to replicate and protect the data modifications made to the second volume by transferring the data modifications (e.g., changed data) to the first volume (currently demoted as the secondary volume). Eventually, client access is restored to the first volume that is then promoted back to being the primary volume, and the second volume is demoted back to being the secondary volume that is now a data protection copy of the primary volume. The resync operation is the process of bringing the primary and secondary volumes in sync where the primary and secondary volumes are storing the same data so that data protection can be restored for the first volume because the first volume and the second volume mirror one another after the resync operation.

A conventional replication engine that replicates data from the primary volume to the secondary volume maintains a data warehouse for the secondary volume. The data warehouse is a database or map of data blocks present on the secondary volume. That is, the data warehouse tracks the locations of each data block on the secondary volume (e.g., tracking virtual volume block numbers such as a virtual volume block number of a data block on the secondary volume that is mapped to a virtual volume block number of a corresponding block on the primary volume that stores the same data). The data warehouse is used by conventional clone replication techniques to reconstruct clone files being replicated from the primary volume to the secondary volume. Without the data warehouse, the conventional clone replication techniques cannot reconstruct clone files because the data warehouse stores virtual volume block numbers of parent files that are to be referenced by the clone files. Thus, storage efficiency provided by clone files is lost because the clone files cannot reference blocks of data of the parent files.

During the error recovery (e.g., disaster recovery), the conventional replication engine processes the data warehouse at the second site to create virtual volume block number (VVBN) mappings from the second volume (primary volume) to the first volume (secondary volume). The mappings are sent as replication operations from to the first site and are populated as entries within the data warehouse being rebuilt. This enables the ability to share data blocks (e.g., sharing between a data warehouse file block number and a container file of the first volume) such that further transfers can share the existing blocks to preserve storage efficiency (e.g., if a block of data is being resynced to the first volume that already comprises that data, then the data is not redundantly stored again but a reference is created to indicate that the data is now pointed to by multiple sources). This block sharing can be used to reconstruct clone files that share blocks of data of parent files.

Unfortunately, data sharing consumes a significant amount of time during the resync operation. The replication engine performs resync transfers that would have to rebuild the entire data warehouse at the first site for the first volume (currently demoted to being the secondary volume) that will be updated with the data modifications of the second volume that is currently promoted to being the primary volume. Because the entire data warehouse must be rebuilt for the entire volume and not just for the data modifications, the resync transfer times are proportional to the size of the entire volume. Since volumes can be tens to hundreds of terabytes (TBs), it is difficult, if not impossible, for the replication engine to satisfy disaster recovery service level objectives. Thus, the rebuilding of the data warehouse is a long running process that can take a substantial amount of time (e.g., hours to days) that exceeds the disaster recovery service level objectives of clients. Furthermore, the data warehouse is rebuilt before the data modifications are transferred from the second volume to the first volume, which also increases the time to perform the overall resync operation. Because the conventional replication engine can be used as a common transfer engine for other processes such as asynchronous replication, synchronous replication, and virtual server (e.g., Vserver) migration use cases, the longer resync times become a broad problem.

As will be discussed in further detail in relation to FIGS. 1-5, the disclosed techniques overcome these technical challenges and inefficiencies by efficiently replicating clone files without reliance on a data warehouse at the destination. The clone files are replicated in a manner that preserves storage efficiency of the clone files that reference shared blocks of data of parent files reconstructed at the destination. The clone files are replicated without the storage and processing overhead of implementing a data warehouse that must be first rebuilt at the destination to track virtual volume block numbers of parent files that are shared with clone files. The clone files are replicated without the processing overhead of iterating through files at the source to identify shared blocks and unshared blocks amongst clone files and parent files to replicate the clone files. In some embodiments, the clone files may be replicated as part of a resync operation or other type of replication operation between nodes.

Some examples of the claimed subject matter are now described with reference to the drawings, where like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. Nothing in this detailed description is admitted as prior art.

FIG. 1 is a block diagram illustrating an example of a system 100 for replicating clone files from a first file system 104 of a first node 102 (source node) to a second node 110 (destination node) for reconstructing or updating a second file system 112. In some embodiments, a node such as the first node 102 or the second node 110 may be a storage node of a computing system. In some embodiments, the node may be hosted as a container, a virtual machine, a server, or any other type of computing system. The first node 102 may host a first file system 104 that organizes data of a first volume into file and directories. The first node 102 may provide clients 109 with access to the data organized by the first file system 104. The first file system 104 may provide the ability to create clones of files. A clone file is created by cloning a parent file. The clone file is storage efficient because the clone file references blocks of data of the parent file instead of the blocks being physically replicated and redundantly stored. Over time, snapshots 106 may be created of the first file system 104. A snapshot is a point in time representation of the first file system 104. The snapshots 106 may include a first snapshot that captures a first state of the first file system 104 at a first point in time. The snapshots 106 may include a second snapshot that captures a second state of the first file system 104 at a second point in time. A difference operation may be performed, such as during a resync operation or other replication operation, upon the first snapshot and the second snapshot to identify changed data (e.g., files or directories created, deleted, or modified between the first point of time of the first snapshot and the second point of time of the second snapshot). If the first snapshot was previously used to replicate data to a second node 110, then the change data can be used for incremental replication that merely replicates the changed data to the second node 110.

The techniques disclosed herein provide for a replication component 101 configured to identify and replicate the changed data from the first node 102 to the second node 110 for reconstructing or updating the second file system 112. In some embodiments, the replication component 101 may be utilized as part of a resync operation to resynchronize the second file system 112 to a current state of the first file system 104 (e.g., the first file system 104 may have been processing client input/output (I/O) operations during a failure of the second file system 112, and the resync operation may be performed as part of recovering the second file system 112 so that client I/O can be rerouted back to the second file system 112 after the resync operation).

While the first node 102 is hosting the first file system 104, the first node 102 may process clone creation requests such as from the clients 109. A file that is to be cloned is referred to as a parent file that is being cloned (duplicated) as a clone file. Initially, the clone file will reference blocks of data of the parent file so that the blocks of data are not physically duplicated, and thus the clone file (that is, a thin clone) is storage efficient because the data of the parent file is not duplicated and redundantly stored. Over time the clone file may diverge from the parent file as new data is written to the clone file, or existing data is deleted or modified. These modifications are written to different blocks than the blocks storing data of the parent file so that the modifications do not modify the parent file.

A metafile 108 is maintained at the first node 102 to track clone relationship information between clone files and parent files at the first node 102. The clone relationship information may include an identifier of a clone file, an identifier of a parent file, an indication that the clone file is a clone of the parent file, information about what blocks are shared blocks between the parent file and the clone file, information about what blocks are non-shared blocks that comprise data of the clone file that are not part of the parent file, etc.

The replication component 101 may be configured to perform a difference operation to identify changed data to replicate from the first node 102 to the second node 110, such as for rebuilding or updating the second file system 112. The replication component 101 may perform a difference operation upon a first snapshot (e.g., a snapshot representing a common point in time where the first file system 104 and the second file system 112 were in-sync and mirrored one another) and a second snapshot (e.g., a most recent snapshot of the first file system 104 that captures changes made to only the first file system 104, thus representing changed data not reflected by the second file system 112). In this way, the replication component 101 replicates the changed data to the second node 110 to apply to the second file system 112.

The replication component 101 is capable of preserving the storage efficiency of how the clone files share blocks of data with the parent files. Accordingly, the replication component 101 identifies changed files during the difference operation. For a changed file, the replication component 101 evaluates the metafile 108 to determine whether the metafile 108 lists the changed file as a clone file of a parent file. If the changed file is a clone file, then the replication component 101 sends inode information of the clone file and parent file information of the parent file to the second node 110. Because the blocks, storing data of the parent file, may not have been received yet by the second node 110, the second node 110 logs the inode information and/or the parent file information into a destination metafile 114 as logged information.

The second node 110 replays the logged information (e.g., the replay may be triggered and/or in response to the replication component 101 completing a data transfer phase of transferring the changed data such that blocks of data of parent files have been stored at the second node 110) to reconstruct the clone files as reconstructed clone files of parent files reconstructed at the second node 110. The reconstructed clone files will retain any references to shared blocks of data of reconstructed parent files, thus preserving the storage efficiency of the clone files.

Figure 4A:
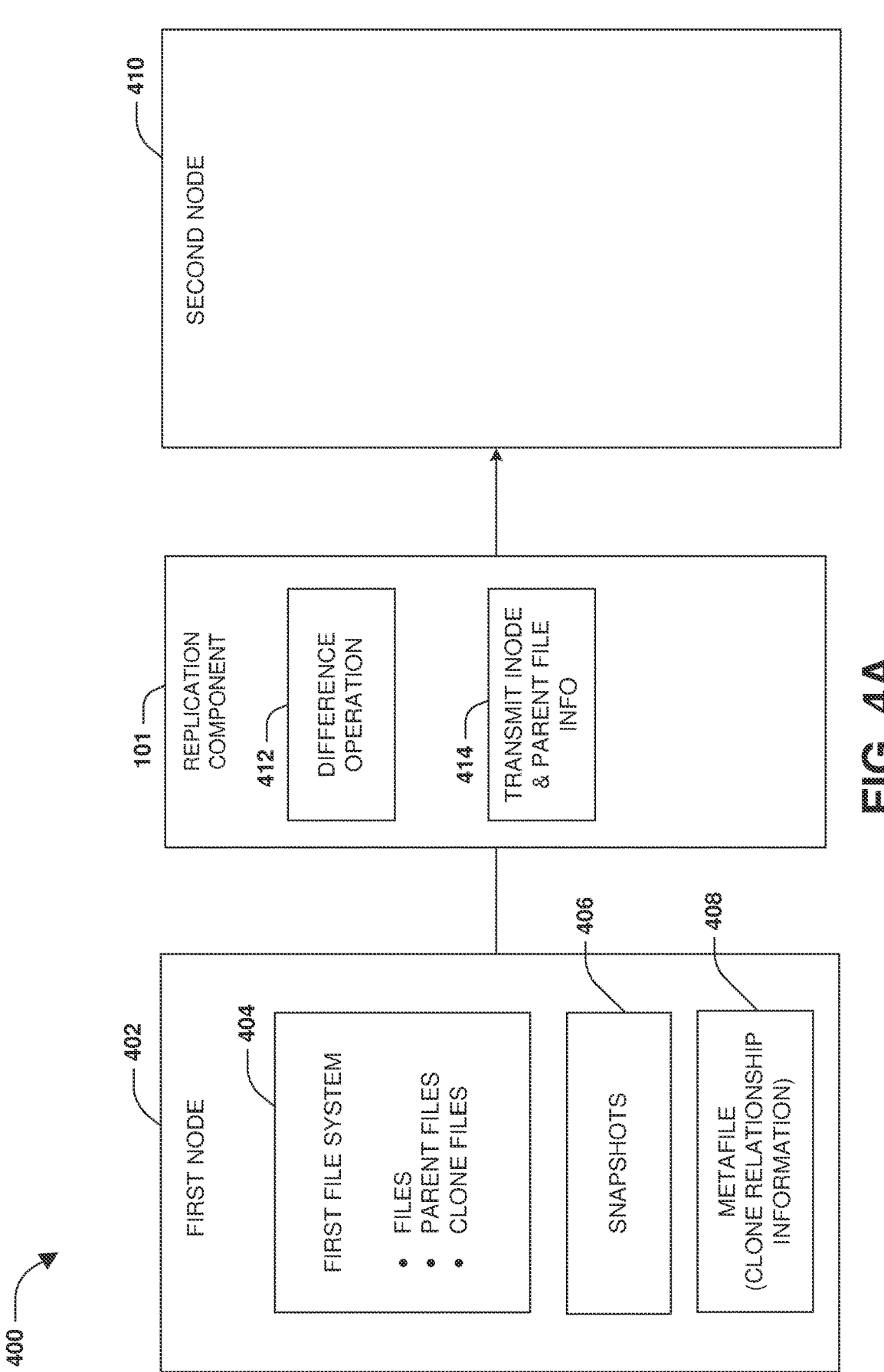
FIG. 4A is a block diagram illustrating an example of a system for replicating clone files from a source file system to a destination file system in accordance with an embodiment of the present technology.

FIG. 2 is a flow chart illustrating an example method 200 for replicating clone files from a source file system to a destination file system, which is described in conjunction with system 400 of FIG. 4A. A first node 402 (source node) may host a first file system 404 that stores data according to directories and files. The first file system 404 may store clone files that are created as clones of parent files. A clone file may share data with a parent file, and thus the clone file may reference blocks of data of the parent file (shared blocks). After creation, the clone file may diverge from the parent file, and thus the clone file may also comprise data stored within data blocks not shared with the parent file. The replication component 101 may be capable of preserving the storage efficiency of clone files that reference blocks of data of parent files when replicating the clone files from the first node 402 to a second node 410 (destination node).

In some embodiments of creating a clone file, a source file's buftree is moved to a private inospace, which is used as the parent file. A reference from the source file to the parent file is created. A reference from the clone file to the parent file is created. The metafile maintained at the source location is updated based upon the references.

In some embodiments of creating a clone file, a clone buftree is created as a copy of a source buftree. The source buftree is moved to an inode in a private space, which is referred to as a clone parent. Moving the source buftree involves moving all the top level/fault line virtual volume block numbers (vbns) from the source buftree to the clone parent. Private space inodes are immutable (the contents of LO blocks store user data or other data that cannot be modified) and hence act as a point-in-time snapshot of the buftree to be cloned. During a clone create operation, the clone buftree is initialized as a virtual block number clone filled buftree with a private inode as its clone parent. Mappings between clone buftree and the parent buftree is tracked in a persistent metafile, which may be referred to as a clone map. The clone map is consulted for data access as well as to perform block sharing. Since the source buftree was also moved to a private inode, a mapping between source buftree range to clone parent is inserted in the clone map. The entire process of creating clone buftree, moving source to a private inode and creating mapping between clone buftree and parent may be performed atomically. This operation is also logged within a non-volatile log. As soon as this process completes, the clone buftree is made available for reads/writes. Reads on the source/clone buftree regions are redirected to the clone parent buftree, by consulting the clone map file.

Block sharing is started in the background for buftrees that are cloned. This operation is referred to as clone split, as it terminates the relationship between clone and its parent. Clone split works by sharing (refcounting) L0 virutal volume block numbers (vbns) from parent buftree to clone buftree. When block sharing for a clone buftree completes, the mapping it has with the parent buftree range is removed from clone map file (a metafile). At this point clone is just like any other regular dense file. When all dependent clones for a private inode are refcounted and their mapping removed, the private inode is deleted. Before a clone buftree is split from its parent, reads to this buftree works through redirection to the parent buftree. The redirection for reads from clones is triggered by a special virtual block number (vbn) in the indirect block (virtual block number clone).

In some embodiments, the replication component 101 may be hosted at the first node 402, at the second node 410, across both the first node 402 and the second node 410, or elsewhere such as within a cloud computing environment, on-premise computing systems, a server, a container, a virtual machine, etc.

Turning now to FIG. 2, during operation 202 of method 200, the first node 402 may track clone relationship information between the clone files and the parent files within a metafile 408. As clone files and/or parent files are created, deleted, modified, and/or split (a clone file may be split from a parent file to become a standalone file no longer referencing the parent file), the metafile 408 may be updated to track current clone relationship information.

The replication component 101 may be invoked to replicate changed data from the first node 402 to the second node 410 such as part of a resync operation. During operation 204 of method 200, the replication component 101 performs a difference operation 412 upon two snapshots such as upon snapshots 406 of the first file system 404 (e.g., a most recent snapshot of the first file system 404, and a common snapshot capturing a state of the first file system 404 and the second file system 422 when both file systems mirrored one another and had the same data and/or metadata). The difference operation 412 compares the two snapshots to identify changed data that is captured in one of the snapshots (e.g., the most recent snapshot) and not in the other snapshot (e.g., the common snapshot). The replication component 101 will transfer the changed data from the first node 402 to a second node 410 during a data transfer phase 420.

The changed data may relate to changed files that are different between the snapshots (e.g., directories and files may be created, modified, deleted, or moved from when the common snapshot was created and the most recent snapshot or between any other snapshots). For each changed file, the replication component 101 may evaluate the metafile 408 to determine whether a changed file is a clone file, during operation 206 of method 200. The evaluation of the metafile 408 may be based upon a determination that the changed file was created between the creation of the two snapshot. In some embodiments, an identifier of the changed file may be used to query the metafile 408 to determine whether the identifier matches an identifier of a clone file mapped to an identifier of a parent file by the metafile 408.

If the changed file is not a clone file, then the replication component 101 will transfer changed blocks of the changed file from the first node to the second node 410 such as during the data transfer phase 420. If the changed file is a clone file of a parent file, then inode information of the clone file and parent file information of the parent file is sent 414 by the replication component 101 from the first node 402 to the second node 410, during operation 208 of method 200. The inode information of the clone file and the parent file information of the parent file is sent 414 to the second node 410 to reconstruct the clone file, which is further described in conjunction with FIGS. 3 and 4B. In some embodiments, if the parent file information for the parent file is sent to the second node 410, then the replication component 101 omits sending references for shared blocks between the clone file and the parent file to the second node 410 because the parent file information is already being tracked by the second node 410

In some embodiments, the clone file and the parent file are evaluated to identify a set of shared blocks storing data shared by the clone file and the parent file and/or to identify a set of unshared blocks storing data of the clone file that is not shared with the parent file (e.g., new data may be written to the clone file after creation of the clone file, and thus the new data is written into unshared blocks because the new data is not shared with the parent file, and the same with modify and delete operations). In some embodiments, the set of unshared blocks may be transmitted from the first node 402 to the second node 410. In some embodiments, an indication of the set of unshared blocks may be transmitted from the first node 402 to the second node 410, and the set of unshared blocks are subsequently replicated as part of the data transfer phase 420. The second node 410 may create a temporary inode to describe the set of unshared blocks and/or may create a placeholder clone file into which the set of unshared blocks are stored.

Figure 3:
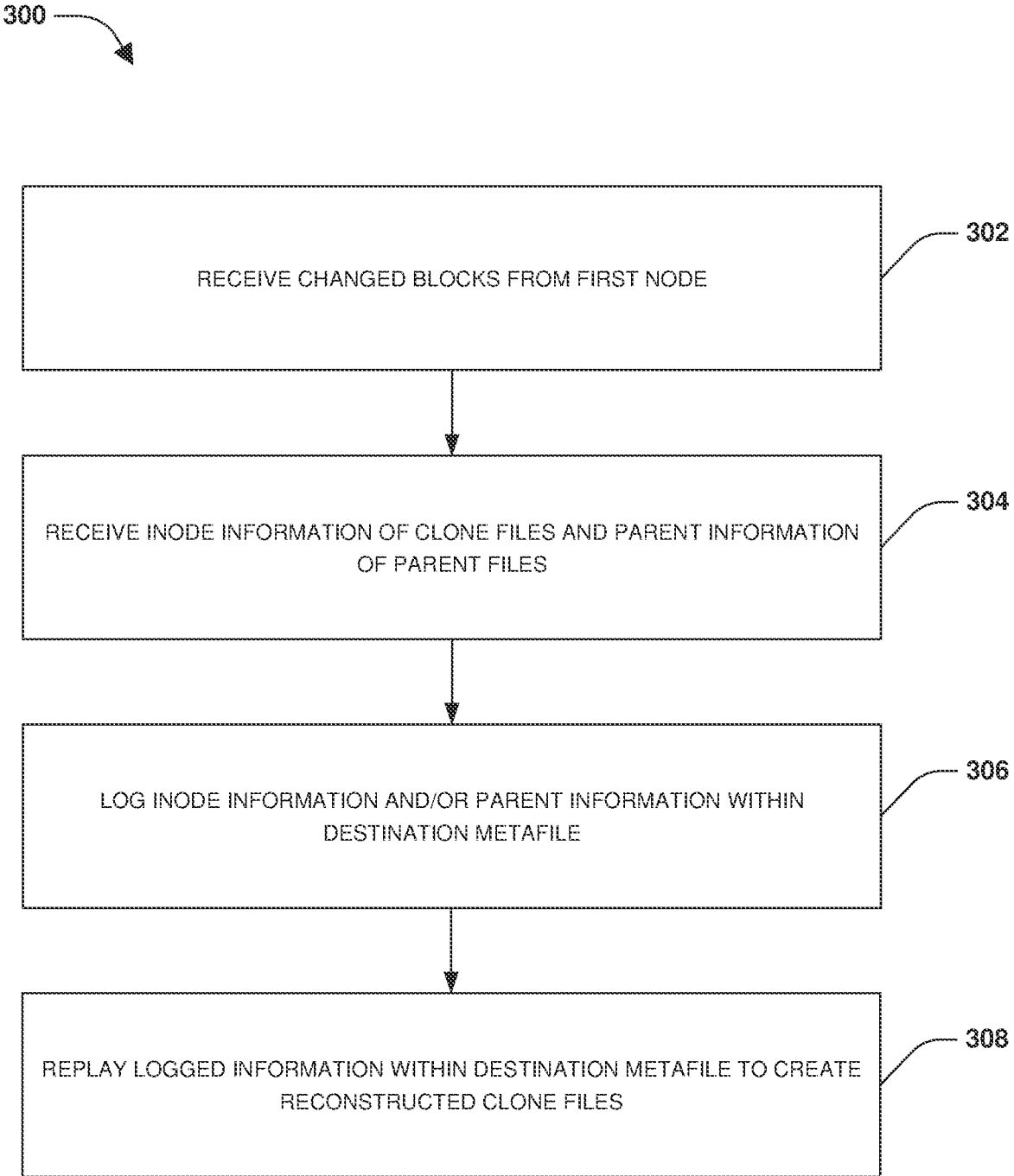
FIG. 3 is a flow chart illustrating an example method for reconstructing clone files at a destination file system in accordance with an embodiment of the present technology.
Figure 4B:
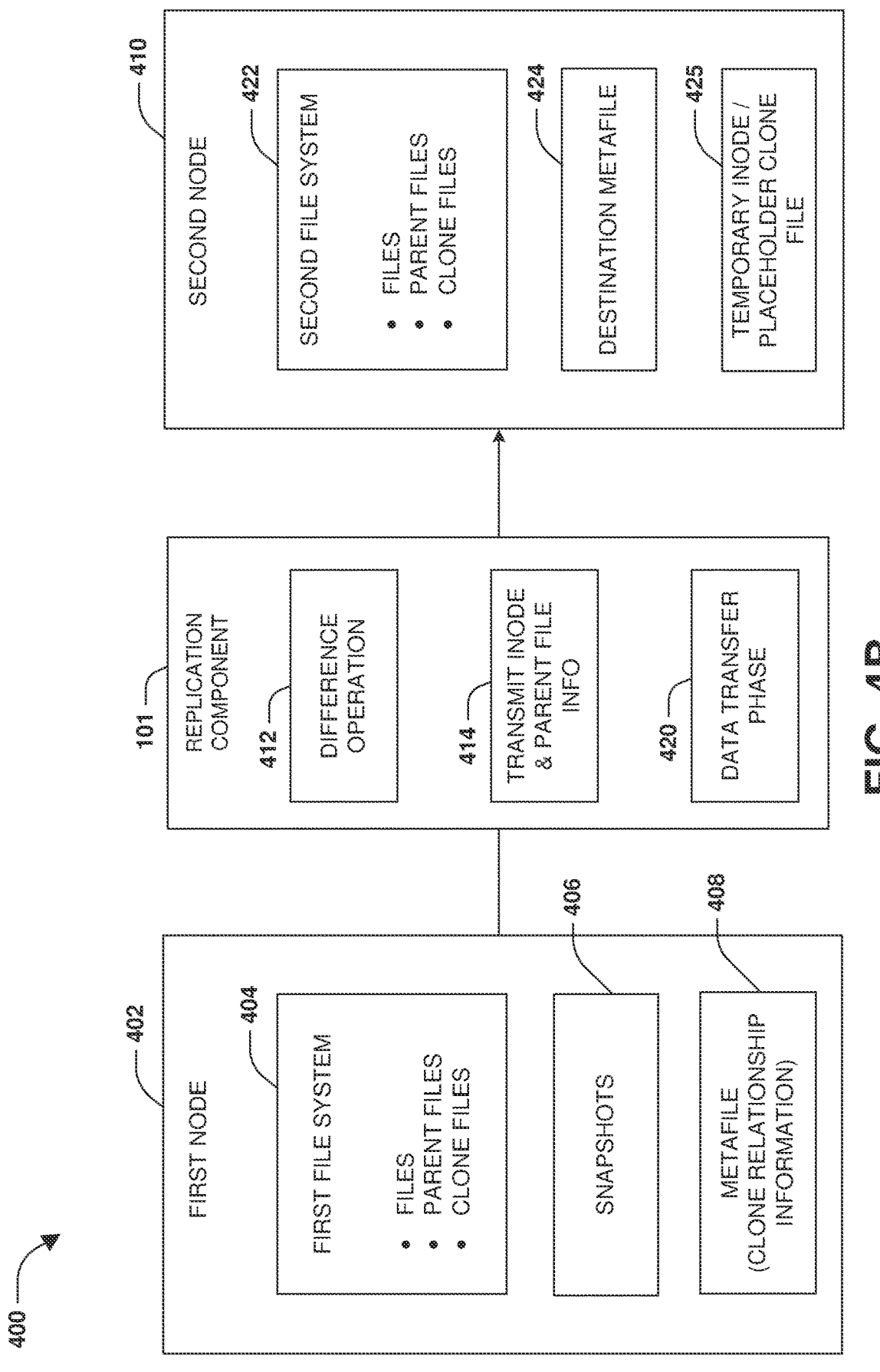
FIG. 4B is a block diagram illustrating an example of a system for reconstructing clone files at a destination file system in accordance with an embodiment of the present technology.

In this way, the replication component 101 transfers changed data, inode and parent file information, and/or unshared blocks to the second node 410 for reconstructing and/or updating the second file system 422 while preserving storage efficiency of the clone files, which is further described in conjunction with FIGS. 3 and 4B. The changed data may be transferred during a data transfer phase of a replication operation performed by the replication component 101 to replicate changes from the first file system 404 to the second file system 422.

FIG. 3 is a flow chart illustrating an example method 300 for replicating clone files from the first file system 404 to the second file system 422, which is described in conjunction with system 400 of FIG. 4B. During operation 302 of method 300, the second node 410 receives the changed data (changed blocks) from the first node 402 for reconstructing or updating the second file system 422. During operation 304 of method 300, the second node 410 receives the inode information of the clone files and/or the parent information of the parent files from the first node 402. During operation 306 of method 300, the second node 410 may log the inode information of the clone files and/or the parent information of the parent files into a destination metafile 424 as logged information. In this way, the destination metafile 424 identifies that a clone file is a clone of a parent file such as until successful transfer of the parent file to the second node 410. In some embodiments where a set of unshared blocks of a clone file are indicated or provided to the second node 410, the second node 410 may create a temporary inode 425 to describe the set of unshared blocks and/or may create a placeholder clone file 425 into which the set of unshared blocks are stored.

During operation 308 of method 300, the logged information within the destination metafile 424 is replayed to create reconstructed clone files within the second file system 422. In some embodiments, the logged information within the destination metafile 424 is replayed after the data transfer phase 420, used to transfer the changed data, has completed so that shared blocks of parent files have been transferred to the second node 410. The logged information such as inode information of a clone file and parent file information of a parent file is used to create a reconstructed clone file that mirrors the clone file at the first node 402 within the first file system 404. In some embodiments, the inode information of the clone file is used to create an inode for the reconstructed clone file. The parent file information is used to create the clone file to reference the shared blocks of the reconstructed parent file in the second file system 422. In some embodiments, additional processing is performed if the clone file diverged from the parent file at the first node 402, which is further described in relation to system 500 of FIG. 5.

Figure 5:
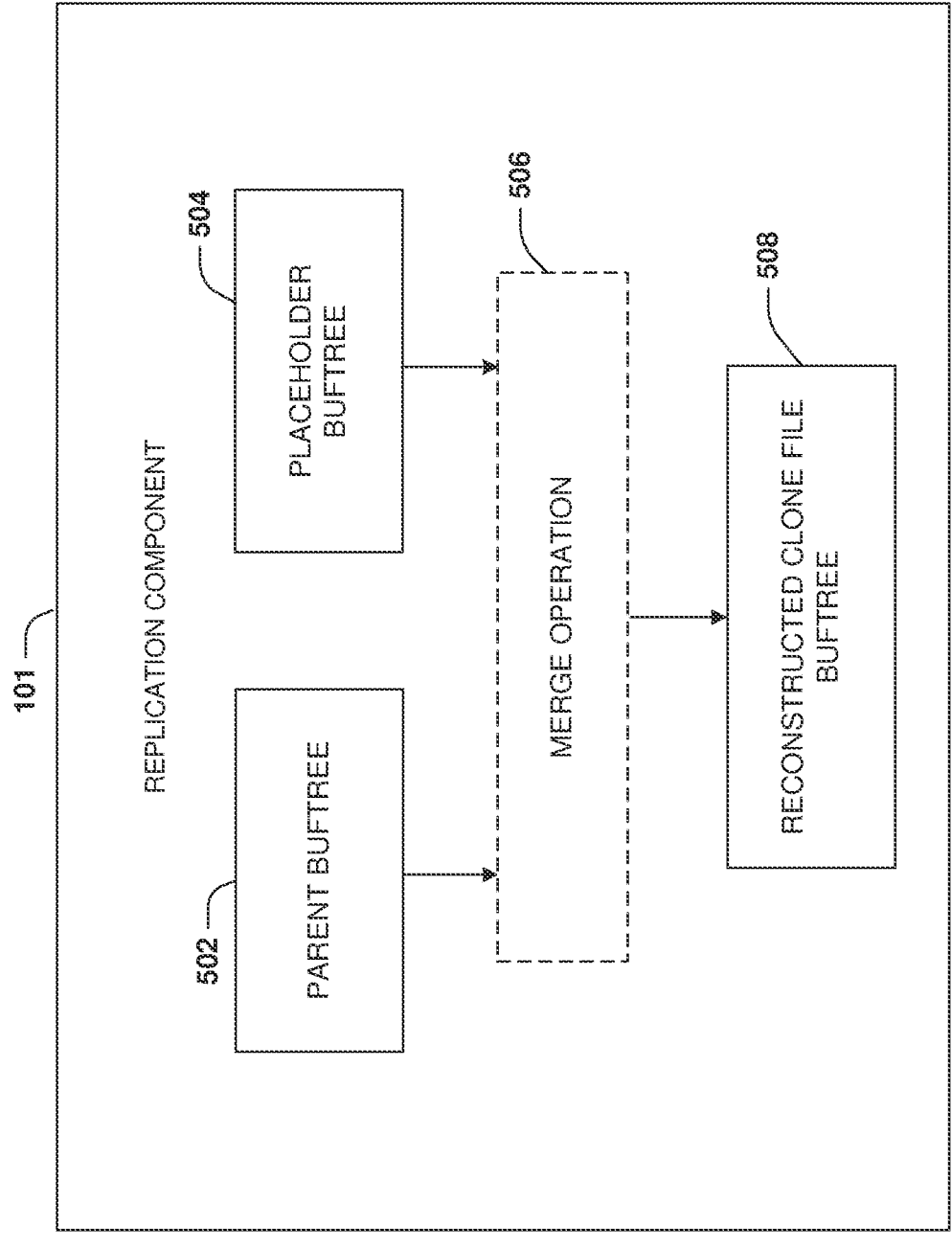
FIG. 5 is a block diagram illustrating an example of a system for reconstructing clone files at a destination file system in accordance with an embodiment of the present technology.

FIG. 5 is a block diagram illustrating an example of a system 500 for replicating clone files from a source file system to a destination file system. The replication component 101 may have performed the data transfer phase 420 to transfer changed data from the first node 402 to the second node 410 for reconstructing or updating the second file system 422 to mirror the first file system 404, as described in relation to FIGS. 3, 4A, and 4B. Some of the clone files being replicated to the second node 410 may have diverged from the parent files such as where the clone files have been modified with modifications not part of the parent files (e.g., new data, not part of a parent file, being written to a clone file; data of the clone file being modified by an operation targeting the clone file and not the parent file; etc.). As previously discussed, temporary inodes, placeholder clone files, and/or unshared blocks storing data of clone files that are not shared with parent files may be created and/or tracked at the second node 410 for reconstructing the clone files at the second node 410.

A placeholder clone file and/or temporary inode 425 may be created for a clone file that has diverged from a parent file. The clone file may reference shared blocks that are shared with the parent file, and the clone file may store unshared blocks that are not shared with the parent file. In some embodiments the shared blocks and the unshared blocks may have been identified during the difference operation 412 where the clone file and the parent file at the first node 402 were evaluated to identify the shared blocks and the unshared blocks. The shared blocks are transferred as part of the data transfer phase 420. The unshared blocks are indicated and/or transferred to the second node 410 either during the data transfer phase 420 or when inode information of the clone file and parent file information of the parent file are transferred to the second node 410 for storage within the destination metafile 424. In some embodiments, the unshared blocks of the clone file are stored as part of the placeholder clone file and are referenced by the temporary inode for the clone file. The parent file may be reconstructed at the second node 410 as a reconstructed parent file. Each reconstructed file and/or placeholder clone file may have a buftree. The buftree may provide an internal representation of blocks of a file, which may be loaded into memory and maintained by a file system. For example, content and metadata of the file are structured as the buftree or other internal representation such as a directed acyclic graph. The buftree may describe collections of blocks (e.g., locations of data stored within blocks of storage). Access to the file is obtained by traversing the buftree from a root node down to a leaf node of where actual file content is stored. Intermediate nodes of the buftree may represent levels of indirection that are traversed to reach the actual file content.

The replication component 101 may perform a merge operation 506 to merge a parent internal representation of the reconstructed parent file such as a parent buftree 502 with a placeholder internal representation of the placeholder clone file such as a placeholder buftree 504. The merge operation 506 may utilize logged information within the destination metafile 424 such as parent file information of the parent file to merge the parent buftree 502 and the placeholder buftree 504 to create a reconstructed clone file buftree 508 of a reconstructed clone file that is a clone of the reconstructed parent file and mirrors the clone file at the first node 402. In this way, the placeholder clone file, the placeholder buftree 504, and/or the temporary inode are transformed into the reconstructed clone file, the reconstructed clone file buftree 508, and/or a reconstructed clone file inode at the second node 410 to complete the replication of the clone file while preserve storage efficiency of the clone file by referencing the shared blocks shared between the reconstructed clone file and the reconstructed parent file, and including the unshared blocks not shared with the reconstructed parent file.

In an example, the clone file may be created from a parent file that is 200 megabytes (MB) in size. Initially, the clone file references all blocks storing the 200 MB of shared data of the parent file. A write operation may be performed to the clone file that overwrites, for example, the last 40 MB, which is written to unshared blocks that are not shared with the parent file. During the difference operation 412, the 40 MB is identified, and is indicated or transferred to the second node 410 for the creation of a placeholder clone file and/or a temporary inode used to store and reference the unshared blocks storing the 40 MB. After the merge operation 506, the reconstructed clone file will reference the first 160 MB (in this example) of the reconstructed parent file and will comprise the 40 MB that is not shared with the reconstructed parent file.

In some embodiments of performing logical clone replication, file clones at a source location (e.g., a computing device or environment hosting a source/primary volume and/or file system) are tracked in a metafile by tracking parent file information and clone file information within the metafile maintained at the source location. During a snapshot difference operation that identifies data changes (changed files) at the source location, a check is performed to determine if a changed file is a clone file. If the changed file is a clone file, then parent information for a parent file of the clone file is obtained from the metafile. During a transfer from the source location to a destination location, when the source location sends inode information of the clone file, the source location also sends parent file information to the destination location. During the snapshot difference operation, the source location omits sending references to shared blocks that are shared between the clone file and the parent file since the parent file information was already sent to the destination location. Upon receiving the inode information of the clone file, the destination location logs the inode information in a destination metafile maintained at the destination location. The destination location replays the destination metafile after the completion of regular data transfer of the changed data (e.g., after completion of a data transfer phase). As part of replay handling, the destination location creates a clone volume and/or file system that mirrors the source/primary volume and/or file system, which includes reconstructed clone files and parent files.

In some embodiments of creating a reconstructed clone file, a placeholder buftree is created at the destination location (a destination node or second node) for the reconstructed clone file. The placeholder buftree is populated with a difference between the source parent file and the source clone file at the source location (a source node or first node). After the data transfer is performed to replicate changed data from the source location to the destination location, a buftree of the source file is moved to a private inospace, and both the source and clone file point to the parent file. At the destination location, the source file and the clone parent file (reconstructed files) have the same buftree, which might not be the situation at the source location. A metafile (a clone metafile) is updated to match the source and clone file.

In some embodiments of replicating clone files, the source location performs various operations such as whenever a clone file is created, an entry is added to the metafile 408 with clone inum as a key and source file inum and generation as a payload. During a difference operation, an operation is performed to get clone source files from the metafile 408 for inode ranges that are being operated on by the difference operation. All the newly created clones will have the clone source file inode and generation saved in a difference operation inode file context. The difference operation generates inode operation for the clone along with the source file inode and generation number. The difference operation would then perform a difference computation between the clone file (in split or unsplit state) and the source file and send the resulting operations with the clone flag set.

The destination location performs various operations such as where the replication component 101 (a handler that handles/processing operations) applies the clone inode op and creates a clone create replop (replication operation) out of this and buffers it for later processing. Upon receiving the clone inode op, a destination file system will create a clone buftree (a placeholder buftree) without a backing parent tree. Upon receiving any of the other operations with the clone flag set, the second file system 422 will perform the same operations as above, if the inode operation has not arrived yet, along with applying these operations. Once the data transfer phase transfer is done, the clone buftree includes the changed blocks with respect to its source file written. During post processing, the handler may replay the buffered clone create operations and send a message to the second file system 422 to create the reconstructed clones. On receiving the clone create message, the destination file system may stitch the reconstructed clone to its source file and return a success indication to the handler. If required, the destination file systems starts a clone split operation in the background if a reconstructed clone file is to be split from a reconstructed parent file.

In some embodiments, the metafile 408 is a per-volume bplus metafile that records all clone create operations on a volume. The metafile 408 is populated with parent information of a parent file such as a source inum (e.g., an inode number of an inode of the parent file; a file identifier) and a source generation number (e.g., an inode generation number of the parent file). In some embodiments, the metafile 408 includes a clone generation number, a create time, a source inum (e.g., a source file identifier), a source generation number, and/or other flags.

Figure 6:
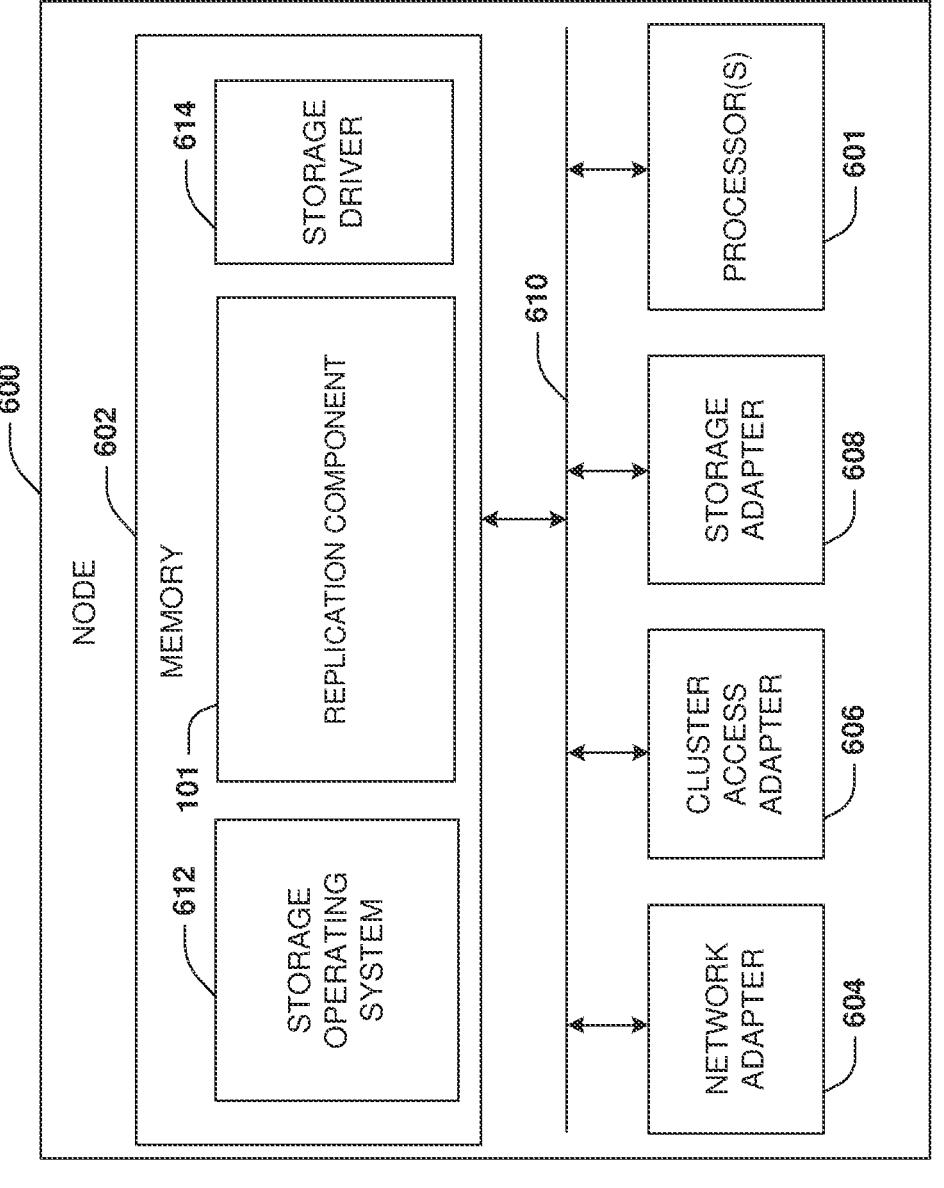
FIG. 6 is a block diagram illustrating an example of a node in accordance with an embodiment of the present technology.

Referring to FIG. 6, a storage node 600 (also referred to as a storage storage node) in this particular example includes processor(s) 601, a memory 602, a network adapter 604, a cluster access adapter 606, and a storage adapter 608 interconnected by a system bus 610. In other examples, the storage node 600 comprises a virtual machine, such as a virtual storage machine.

The storage node 600 also includes a storage operating system 612 installed in the memory 602 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc.

The network adapter 604 in this example includes the mechanical, electrical and signaling circuitry needed to connect the storage node 600 to one or more of the client devices over network connections, which may comprise, among other things, a point-to-point connection or a shared medium, such as a local area network. In some examples, the network adapter 604 further communicates (e.g., using Transmission Control Protocol/Internet Protocol (TCP/IP)) via a cluster fabric and/or another network (e.g., a WAN (Wide Area Network)) (not shown) with storage devices of a distributed storage system to process storage operations associated with data stored thereon.

The storage adapter 608 cooperates with the storage operating system 612 executing on the storage node 600 to access information requested by one of the client devices (e.g., to access data on a data storage device managed by a network storage controller). The information may be stored on any type of attached array of writeable media such as magnetic disk drives, flash memory, and/or any other similar media adapted to store information.

In exemplary data storage devices, information can be stored in data blocks on disks. The storage adapter 608 can include I/O interface circuitry that couples to the disks over an I/O interconnect arrangement, such as a storage area network (SAN) protocol (e.g., Small Computer System Interface (SCSI), Internet SCSI (ISCSI), hyperSCSI, Fiber Channel Protocol (FCP)). The information is retrieved by the storage adapter 608 and, if necessary, processed by the processor(s) 601 (or the storage adapter 608 itself) prior to being forwarded over the system bus 610 to the network adapter 604 (and/or the cluster access adapter 606 if sending to another node computing device in the cluster) where the information is formatted into a data packet and returned to a requesting one of the client devices and/or sent to another node computing device attached via a cluster fabric. In some examples, a storage driver 614 in the memory 602 interfaces with the storage adapter to facilitate interactions with the data storage devices.

The storage operating system 612 can also manage communications for the node 600 among other devices that may be in a clustered network, such as attached to the cluster fabric. Thus, the node 600 can respond to client device requests to manage data on one of the data storage devices or storage devices of the distributed storage system in accordance with the client device requests.

The node 600 may implement a replication component 101 configured to perform the techniques described herein such as in relation to FIGS. 1-5. For example, replication component 101 may be configured to replicate clone files from a first node to a second node.

In the example node 600, memory 602 can include storage locations that are addressable by the processor(s) 601 and adapters 604, 606, and 608 for storing related software application code and data structures. The processor(s) 601 and adapters 604, 606, and 608 may, for example, include processing elements and/or logic circuitry configured to execute the software code and manipulate the data structures.

The storage operating system 612, portions of which are typically resident in the memory 602 and executed by the processor(s) 601, invokes storage operations in support of a file service implemented by the node 600. Other processing and memory mechanisms, including various computer readable media, may be used for storing and/or executing application instructions pertaining to the techniques described and illustrated herein.

The examples of the technology described and illustrated herein may be embodied as one or more non-transitory computer or machine readable media, such as the memory 602, having machine or processor-executable instructions stored thereon for one or more aspects of the present technology, which when executed by processor(s), such as processor(s) 601, cause the processor(s) to carry out the steps necessary to implement the methods of this technology, as described and illustrated with the examples herein. In some examples, the executable instructions are configured to perform one or more steps of a method described and illustrated later.

Figure 7:
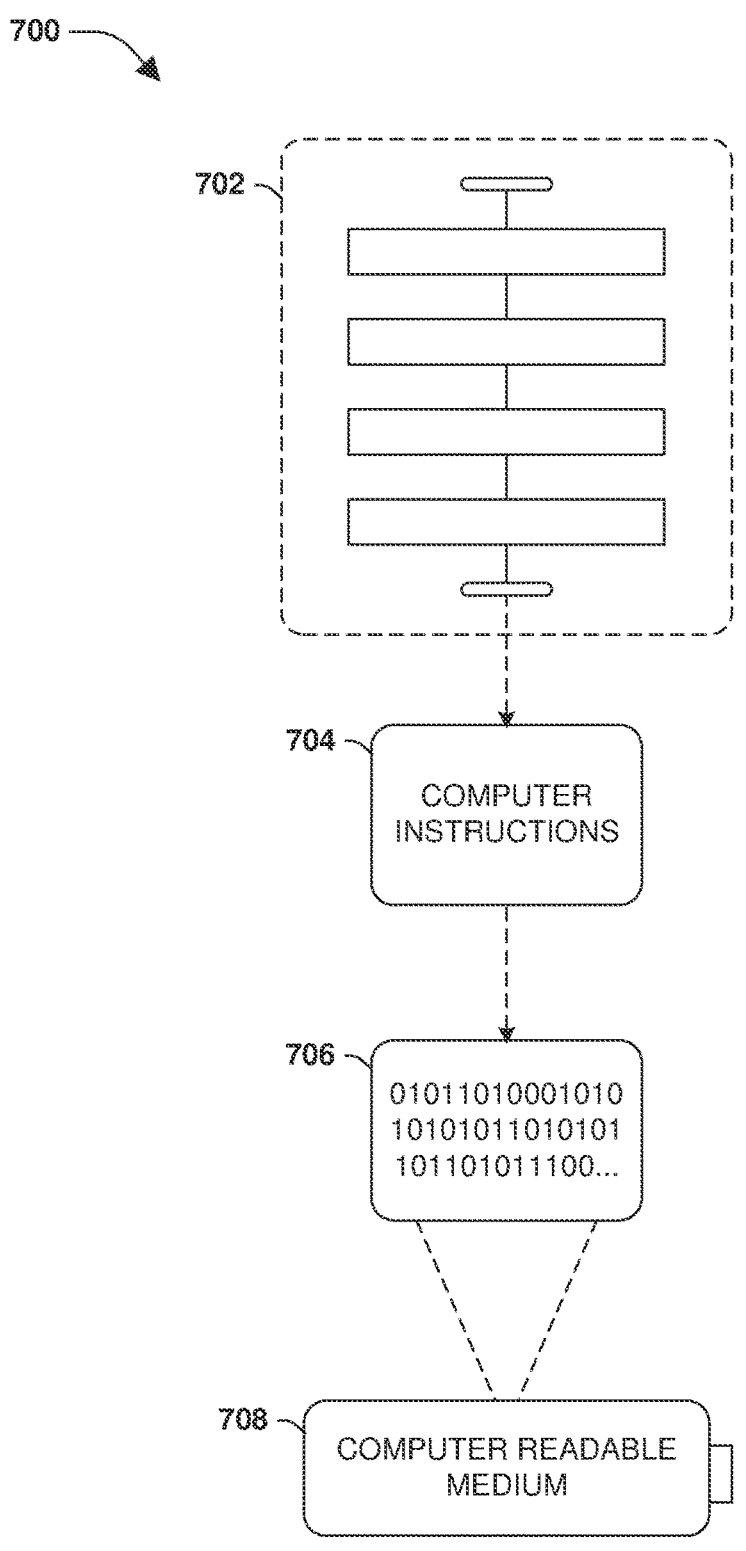
FIG. 7 is an example of a computer readable medium in which an embodiment of the present technology may be implemented.

Still another embodiment involves a computer-readable medium 700 comprising processor-executable instructions configured to implement one or more of the techniques presented herein. An example embodiment of a computer-readable medium or a computer-readable device that is devised in these ways is illustrated in FIG. 7, wherein the implementation comprises a computer-readable medium 708, such as a compact disc-recordable (CD-R), a digital versatile disc-recordable (DVD-R), flash drive, a platter of a hard disk drive, etc., on which is encoded computer-readable data 706. This computer-readable data 706, such as binary data comprising at least one of a zero or a one, in turn comprises processor-executable computer instructions 704 configured to operate according to one or more of the principles set forth herein. In some embodiments, the processor-executable computer instructions 704 are configured to perform a method 702 such as method 200 of FIG. 2 and/or method 300 of FIG. 3. In some embodiments, the processor-executable computer instructions 704 are configured to implement a system such as system 100 of FIG. 1, system 400 of FIGS. 4A and 4B, and/or system 500 of FIG. 5. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM) s, CD-Rs, compact disk re-writeable (CD-RW) s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In some embodiments, a method is provided. The method includes tracking, within a metafile hosted at a first storage node, clone relationship information between clone files and parent files at the first storage node; performing a difference operation upon two snapshots to identify and transfer changed data from the first storage node to a second storage node; in response to identifying a changed file during the difference operation, evaluating the metafile to determine whether the changed file is a clone file of a parent file; and in response to the changed file being the clone file, transmitting inode information of the clone file and parent file information of the parent file to the second storage node for reconstruction of the clone file at the second storage node as a reconstructed clone file using the inode information and the parent file information.

In some embodiments, the method includes in response to determining that the parent file information was sent to the second storage node, skipping transmission of references for shared blocks between the clone file and the parent file to the second storage node.

In some embodiments, the method includes in response to the second storage node receiving the inode information, logging the inode information within a destination metafile maintained by the second storage node.

In some embodiments, the method includes logging at least one of the inode information or the parent file information into a destination metafile; and replaying, at the second storage node, logged information within the destination metafile to create the reconstructed clone file, at the second storage node, to mirror the clone file at the first storage node.

In some embodiments, the method includes logging at least one of the inode information or the parent file information into a destination metafile; transferring the changed data during a data transfer phase of a replication operation that replicates data from the first storage node to the second storage node; and in response the data transfer phase completing, replaying, at the second storage node, logged information within the destination metafile to create reconstructed clone files, at the second storage node, to mirror clone files at the first storage node.

In some embodiments, the method includes in response determining that the changed file is a non-clone file, transferring changed blocks of the changed file from the first storage node to the second storage node.

In some embodiments, the method includes triggering evaluation of the metafile based upon a determination that the changed file was created between creation of the two snapshots.

In some embodiments, the method includes storing at least one of the inode information or the parent file information within a destination metafile as an indication that the clone file is a clone of the parent file until successful transfer of the parent file to the second storage node.

In some embodiments, the method includes reconstructing the clone file as the reconstructed clone file and the parent file as a reconstructed parent file at the second storage node; and utilizing the parent file information to merge a first internal representation of the reconstructed clone file with a second internal representation of the reconstructed parent file.

In some embodiments, a computing device is provided. The computing device includes a memory storing instructions and a processor coupled to the memory, the processor configured to execute the instructions to perform operations. The operations include tracking, within a metafile hosted at a first storage node, clone relationship information between clone files and parent files at the first storage node; performing a difference operation upon two snapshots to identify and transfer changed data from the first storage node to a second storage node; in response to identifying a changed file during the difference operation, evaluating the metafile to determine whether the changed file is a clone file of a parent file; and in response to the changed file being the clone file, transmitting inode information of the clone file and parent file information of the parent file to the second storage node for reconstruction of the clone file at the second storage node as a reconstructed clone file using the inode information and the parent file information.

In some embodiments, the operations includes during the difference operation, evaluating the clone file and the parent file to identify a set of shared blocks storing data shared by the clone file and the parent file and a set of unshared blocks storing data of the clone file that is not shared with the parent file; and transmitting the set of unshared blocks to the second storage node.

In some embodiments, the operations includes during the difference operation, evaluating the clone file and the parent file to identify a set of shared blocks storing data shared by the clone file and the parent file and a set of unshared blocks storing data of the clone file that is not shared with the parent file; and transmitting, from the first storage node to the second storage node, an indication of the set of unshared blocks.

In some embodiments, the operations includes during the difference operation, evaluating the clone file and the parent file to identify a set of shared blocks storing data shared by the clone file and the parent file and a set of unshared blocks storing data of the clone file that is not shared with the parent file; and creating, at the second storage node, a temporary inode to accommodate the set of unshared blocks.

In some embodiments, the operations includes during the difference operation, evaluating the clone file and the parent file to identify a set of shared blocks storing data shared by the clone file and the parent file and a set of unshared blocks storing data of the clone file that is not shared with the parent file; transmitting the set of unshared blocks to the second storage node; and creating, at the second storage node, a placeholder clone file into which the set of unshared blocks are stored.

In some embodiments, the operations includes during the difference operation, evaluating the clone file and the parent file to identify a set of shared blocks storing data shared by the clone file and the parent file and a set of unshared blocks storing data of the clone file that is not shared with the parent file; creating, at the second storage node, a placeholder clone file into which the set of unshared blocks are stored; reconstructing the parent file as a reconstructed parent file at the second storage node; and utilizing the parent file information to merge a first internal representation of the placeholder clone file with a second internal representation of the reconstructed parent file to transform the placeholder clone file into the reconstructed clone file comprised of the data from the set of shared blocks and the data from the set of unshared blocks.

In some embodiments, the operations includes creating, at the second storage node, a placeholder clone file comprised of a set of unshared blocks storing data of the clone file that are not shared with the parent file; and utilizing the parent file information to merge a first buftree of the placeholder clone file with a second buftree of a reconstructed parent file of the parent file to create the reconstructed clone file comprised of the data from the set of unshared blocks and data from a set of shared blocks shared between the clone file and the parent file.

In some embodiments, non-transitory machine readable medium is provided. The non-transitory machine readable medium comprises instructions for performing a method, which when executed by a machine, causes the machine to perform operations. The operations include tracking, within a metafile hosted at a first storage node, clone relationship information between clone files and parent files at the first storage node; performing a difference operation upon two snapshots to identify and transfer changed data from the first storage node to a second storage node; in response to identifying a changed file during the difference operation, evaluating the metafile to determine whether the changed file is a clone file of a parent file; and in response to the changed file being the clone file, transmitting inode information of the clone file and parent file information of the parent file to the second storage node for reconstruction of the clone file at the second storage node as a reconstructed clone file using the inode information and the parent file information.

In some embodiments, the operations includes during the difference operation, evaluating the clone file and the parent file to identify a set of shared blocks storing data shared by the clone file and the parent file and a set of unshared blocks storing data of the clone file that is not shared with the parent file; and transmitting the set of unshared blocks to the second storage node.

In some embodiments, the operations includes during the difference operation, evaluating the clone file and the parent file to identify a set of shared blocks storing data shared by the clone file and the parent file and a set of unshared blocks storing data of the clone file that is not shared with the parent file; creating, at the second storage node, a placeholder clone file into which the set of unshared blocks are stored; reconstructing the parent file as a reconstructed parent file at the second storage node; and utilizing the parent file information to merge a first internal representation of the placeholder clone file with a second internal representation of the reconstructed parent file to transform the placeholder clone file into the reconstructed clone file comprised of the data from the set of shared blocks and the data from the set of unshared blocks.

In some embodiments, the operations includes creating, at the second storage node, a placeholder clone file comprised of a set of unshared blocks storing data of the clone file that are not shared with the parent file; and utilizing the parent file information to merge a first buftree of the placeholder clone file with a second buftree of a reconstructed parent file of the parent file to create the reconstructed clone file comprised of the data from the set of unshared blocks and data from a set of shared blocks shared between the clone file and the parent file.

In some embodiments, a method is provided. The method includes receiving, by a destination storage node as part of a resync operation, changed blocks from a source storage node in response to the destination storage node recovering from a failure; receiving, by the destination storage node from the source storage node during the resync operation, inode information of clone files and parent information of parent files; logging the inode information and the parent information into a destination metafile as logged information; and replaying the logged information from the destination metafile to create reconstructed clone files as part of reconstructing a destination file system at the destination storage node.

In some embodiments, the method includes reconstructing a clone file as a reconstructed clone file and a parent file as a reconstructed parent file at the destination storage node; and utilizing the parent file information to merge a first internal representation of the reconstructed clone file with a second internal representation of the reconstructed parent file.

In some embodiments, the method includes creating, at the destination storage node, a placeholder clone file comprised of a set of unshared blocks storing data of a clone file that are not shared with a parent file; and utilizing the parent file information to merge a first buftree of the placeholder clone file with a second buftree of a reconstructed parent file of the parent file to create the reconstructed clone file comprised of the data from the set of unshared blocks and data from a set of shared blocks shared between the clone file and the parent file.

In some embodiments, the method includes during a difference operation, evaluating a clone file and a parent file to identify a set of shared blocks storing data shared by the clone file and the parent file and a set of unshared blocks storing data of the clone file that is not shared with the parent file; creating, at the destination storage node, a placeholder clone file into which the set of unshared blocks are stored; reconstructing the parent file as a reconstructed parent file at the destination storage node; and utilizing the parent file information to merge a first internal representation of the placeholder clone file with a second internal representation of the reconstructed parent file to transform the placeholder clone file into the reconstructed clone file comprised of the data from the set of shared blocks and the data from the set of unshared blocks.

In some embodiments, the method includes rebuilding a destination file system using the changed blocks received from the source storage node, wherein the destination file system is rebuilt to mirror a source file system maintained by the source storage node.

In some embodiments, the method includes evaluating the logged information to determine that a file is not a clone file; and creating a reconstructed file using the changed blocks received from the source storage node.

In some embodiments, the method includes creating a reconstructed clone file utilizing a set of shared blocks received from the source storage node.

In some embodiments, a computing device is provided. The computing device includes a memory storing instructions and a processor coupled to the memory, the processor configured to execute the instructions to perform operations. The operations include receiving, by a destination storage node as part of a resync operation, changed blocks from a source storage node in response to the destination storage node recovering from a failure; receiving, by the destination storage node from the source storage node during the resync operation, inode information of clone files and parent information of parent files; logging the inode information and the parent information into a destination metafile as logged information; and replaying the logged information from the destination metafile to create reconstructed clone files as part of reconstructing a destination file system at the destination storage node.

In some embodiments, the operations include reconstructing a clone file as a reconstructed clone file and a parent file as a reconstructed parent file at the destination storage node; and utilizing the parent file information to merge a first internal representation of the reconstructed clone file with a second internal representation of the reconstructed parent file.

In some embodiments, the operations include creating, at the destination storage node, a placeholder clone file comprised of a set of unshared blocks storing data of a clone file that are not shared with a parent file; and utilizing the parent file information to merge a first buftree of the placeholder clone file with a second buftree of a reconstructed parent file of the parent file to create the reconstructed clone file comprised of the data from the set of unshared blocks and data from a set of shared blocks shared between the clone file and the parent file.

In some embodiments, the operations include during a difference operation, evaluating a clone file and a parent file to identify a set of shared blocks storing data shared by the clone file and the parent file and a set of unshared blocks storing data of the clone file that is not shared with the parent file; creating, at the destination storage node, a placeholder clone file into which the set of unshared blocks are stored; reconstructing the parent file as a reconstructed parent file at the destination storage node; and utilizing the parent file information to merge a first internal representation of the placeholder clone file with a second internal representation of the reconstructed parent file to transform the placeholder clone file into the reconstructed clone file comprised of the data from the set of shared blocks and the data from the set of unshared blocks.

In some embodiments, the operations include rebuilding a destination file system using the changed blocks received from the source storage node, wherein the destination file system is rebuilt to mirror a source file system maintained by the source storage node.

In some embodiments, the operations include evaluating the logged information to determine that a file is not a clone file; and creating a reconstructed file using the changed blocks received from the source storage node.

In some embodiments, the operations include creating a reconstructed clone file utilizing a set of shared blocks received from the source storage node.

In some embodiments, non-transitory machine readable medium is provided. The non-transitory machine readable medium comprises instructions for performing a method, which when executed by a machine, causes the machine to perform operations. The operations include receiving, by a destination storage node as part of a resync operation, changed blocks from a source storage node in response to the destination storage node recovering from a failure; receiving, by the destination storage node from the source storage node during the resync operation, inode information of clone files and parent information of parent files; logging the inode information and the parent information into a destination metafile as logged information; and replaying the logged information from the destination metafile to create reconstructed clone files as part of reconstructing a destination file system at the destination storage node.

In some embodiments, the operations include reconstructing a clone file as a reconstructed clone file and a parent file as a reconstructed parent file at the destination storage node; and utilizing the parent file information to merge a first internal representation of the reconstructed clone file with a second internal representation of the reconstructed parent file.

In some embodiments, the operations include creating, at the destination storage node, a placeholder clone file comprised of a set of unshared blocks storing data of a clone file that are not shared with a parent file; and utilizing the parent file information to merge a first buftree of the placeholder clone file with a second buftree of a reconstructed parent file of the parent file to create the reconstructed clone file comprised of the data from the set of unshared blocks and data from a set of shared blocks shared between the clone file and the parent file.

In some embodiments, the operations include during a difference operation, evaluating a clone file and a parent file to identify a set of shared blocks storing data shared by the clone file and the parent file and a set of unshared blocks storing data of the clone file that is not shared with the parent file; creating, at the destination storage node, a placeholder clone file into which the set of unshared blocks are stored; reconstructing the parent file as a reconstructed parent file at the destination storage node; and utilizing the parent file information to merge a first internal representation of the placeholder clone file with a second internal representation of the reconstructed parent file to transform the placeholder clone file into the reconstructed clone file comprised of the data from the set of shared blocks and the data from the set of unshared blocks.

In some embodiments, the operations include rebuilding a destination file system using the changed blocks received from the source storage node, wherein the destination file system is rebuilt to mirror a source file system maintained by the source storage node.

In some embodiments, the operations include evaluating the logged information to determine that a file is not a clone file; and creating a reconstructed file using the changed blocks received from the source storage node.

What is claimed is:

1. A method comprising:

receiving, by a destination storage node as part of a resync operation performed by a computing system, changed blocks from a source storage node in response to the destination storage node recovering from a failure;

receiving, by the destination storage node from the source storage node during the resync operation, inode information of clone files and parent information of parent files;

logging the inode information and the parent information into a destination metafile as logged information; and replaying the logged information from the destination metafile to create reconstructed clone files as part of reconstructing a destination file system at the destination storage node, wherein the replaying includes creating a reconstructed file of a file using the changed blocks received from the source storage node in response to an evaluation of the logged information indicating that the file is not a logged clone file.

2. The method of claim 1, comprising:
reconstructing a clone file as a reconstructed clone file and a parent file as a reconstructed parent file at the destination storage node; and
utilizing the parent file information to merge a first internal representation of the reconstructed clone file with a second internal representation of the reconstructed parent file.

3. The method of claim 1, comprising:
creating, at the destination storage node, a placeholder clone file comprised of a set of unshared blocks storing data of a clone file that are not shared with a parent file; and
utilizing the parent file information to merge a first buftree of the placeholder clone file with a second buftree of a reconstructed parent file of the parent file to create a reconstructed clone file comprised of the data from the set of unshared blocks and data from a set of shared blocks shared between the clone file and the parent file.

4. The method of claim 1, comprising:
during a difference operation, evaluating a clone file and a parent file to identify a set of shared blocks storing data shared by the clone file and the parent file and a set of unshared blocks storing data of the clone file that is not shared with the parent file;
creating, at the destination storage node, a placeholder clone file into which the set of unshared blocks are stored;
reconstructing the parent file as a reconstructed parent file at the destination storage node; and
utilizing the parent file information to merge a first internal representation of the placeholder clone file with a second internal representation of the reconstructed parent file to transform the placeholder clone file into the reconstructed clone file comprised of the data from the set of shared blocks and the data from the set of unshared blocks.

5. The method of claim 1, comprising:
rebuilding a destination file system using the changed blocks received from the source storage node, wherein the destination file system is rebuilt to mirror a source file system maintained by the source storage node.

6. The method of claim 1, comprising:
reconstructing a clone file as a reconstructed clone file and a parent file as a reconstructed parent file at the destination storage node.

7. The method of claim 1, comprising:
creating a reconstructed clone file utilizing a set of shared blocks received from the source storage node.

8. A computing device, comprising:
a memory comprising machine executable code; and
a processor coupled to the memory, the processor configured to execute the machine executable code to cause the machine to perform operations comprising:
receiving, by a destination storage node as part of a resync operation, changed blocks from a source storage node in response to the destination storage node recovering from a failure;
receiving, by the destination storage node from the source storage node during the resync operation, inode information of clone files and parent information of parent files;

logging the inode information and the parent information into a destination metafile as logged information; and
replaying the logged information from the destination metafile to create reconstructed clone files as part of reconstructing a destination file system at the destination storage node, wherein the replaying includes creating a reconstructed clone file utilizing a set of shared blocks received from the source storage node.

9. The computing device of claim 8, wherein the operations comprise:
reconstructing a clone file as the reconstructed clone file and a parent file as a reconstructed parent file at the destination storage node; and
utilizing the parent file information to merge a first internal representation of the reconstructed clone file with a second internal representation of the reconstructed parent file.

10. The computing device of claim 8, wherein the operations comprise:
creating, at the destination storage node, a placeholder clone file comprised of a set of unshared blocks storing data of a clone file that are not shared with a parent file; and
utilizing the parent file information to merge a first buftree of the placeholder clone file with a second buftree of a reconstructed parent file of the parent file to create the reconstructed clone file comprised of the data from the set of unshared blocks and data from a set of shared blocks shared between the clone file and the parent file.

11. The computing device of claim 8, wherein the operations comprise:
during a difference operation, evaluating a clone file and a parent file to identify a set of shared blocks storing data shared by the clone file and the parent file and a set of unshared blocks storing data of the clone file that is not shared with the parent file;
creating, at the destination storage node, a placeholder clone file into which the set of unshared blocks are stored;
reconstructing the parent file as a reconstructed parent file at the destination storage node; and
utilizing the parent file information to merge a first internal representation of the placeholder clone file with a second internal representation of the reconstructed parent file to transform the placeholder clone file into the reconstructed clone file comprised of the data from the set of shared blocks and the data from the set of unshared blocks.

12. The computing device of claim 8, wherein the operations comprise:
rebuilding a destination file system using the changed blocks received from the source storage node, wherein the destination file system is rebuilt to mirror a source file system maintained by the source storage node.

13. The computing device of claim 8, wherein the operations comprise:
evaluating the logged information to determine that a file is not a clone file; and
creating a reconstructed file using the changed blocks received from the source storage node.

14. The computing device of claim 8, wherein the operations comprise:
reconstructing a clone file as the reconstructed clone file and a parent file as a reconstructed parent file at the destination storage node.

15. A non-transitory machine readable medium comprising instructions for performing a method, which when executed by a machine, causes the machine to perform operations comprising:

receiving, by a destination storage node as part of a resync operation, changed blocks from a source storage node in response to the destination storage node recovering from a failure;

receiving, by the destination storage node from the source storage node during the resync operation, inode information of clone files and parent information of parent files;

logging the inode information and the parent information into a destination metafile as logged information; and replaying the logged information from the destination metafile to create reconstructed clone files as part of reconstructing a destination file system at the destination storage node, wherein the replaying comprises:

reconstructing a clone file as a reconstructed clone file and a parent file as a reconstructed parent file at the destination storage node; and utilizing the parent file information to merge a first internal representation of the reconstructed clone file with a second internal representation of the reconstructed parent file.

16. The non-transitory machine readable medium of claim 15, wherein the operations comprise:

creating a reconstructed file using the changed blocks received from the source storage node.

17. The non-transitory machine readable medium of claim 15, wherein the operations comprise:

creating, at the destination storage node, a placeholder clone file comprised of a set of unshared blocks storing data of a clone file that are not shared with a parent file; and utilizing the parent file information to merge a first buftree of the placeholder clone file with a second buftree of the reconstructed parent file of the parent file to create the reconstructed clone file comprised of the data from the set of unshared blocks and data from a set of shared blocks shared between the clone file and the parent file.

18. The non-transitory machine readable medium of claim 15, wherein the operations comprise:

during a difference operation, evaluating a clone file and a parent file to identify a set of shared blocks storing data shared by the clone file and the parent file and a set of unshared blocks storing data of the clone file that is not shared with the parent file;

creating, at the destination storage node, a placeholder clone file into which the set of unshared blocks are stored; and utilizing the parent file information to merge the first internal representation of the placeholder clone file with the second internal representation of the reconstructed parent file to transform the placeholder clone file into the reconstructed clone file comprised of the data from the set of shared blocks and the data from the set of unshared blocks.

19. The non-transitory machine readable medium of claim 15, wherein the operations comprise:

rebuilding a destination file system using the changed blocks received from the source storage node, wherein the destination file system is rebuilt to mirror a source file system maintained by the source storage node.

20. The non-transitory machine readable medium of claim 15, wherein the operations comprise:

evaluating the logged information to determine that a file is not a clone file; and creating a reconstructed file using the changed blocks received from the source storage node.

\* \* \* \* \*